United States Patent

Homma

[11] Patent Number: 6,052,585
[45] Date of Patent: Apr. 18, 2000

[54] MOBILE COMMUNICATION NETWORK

[75] Inventor: Hiroki Homma, Tokyo, Japan

[73] Assignee: NEC Corporation, Japan

[21] Appl. No.: 09/031,332

[22] Filed: Feb. 26, 1998

[30] Foreign Application Priority Data

Feb. 28, 1997 [JP] Japan ..................... 9-045842

[51] Int. Cl.[7] .................................... H04Q 7/20
[52] U.S. Cl. ................ 455/426; 455/434; 455/67.1
[58] Field of Search .................... 455/67.1, 423,
455/425, 426, 434, 436, 427, 437, 442,
552, 553, 12.1, 422; 370/328, 330, 465

[56] References Cited

U.S. PATENT DOCUMENTS

| | | | |
|---|---|---|---|
| 5,373,503 | 12/1994 | Chen | 370/18 |
| 5,491,834 | 2/1996 | Chia | 455/441 |
| 5,517,549 | 5/1996 | Lee | 455/407 |
| 5,594,718 | 1/1997 | Weaver, Jr. et al. | 455/437 |
| 5,806,007 | 8/1998 | Raith et al. | 455/574 |
| 5,819,184 | 10/1998 | Cashman | 455/553 |
| 5,907,555 | 5/1999 | Raith | 455/422 |
| 5,920,821 | 6/1999 | Seazholtz et al. | 455/466 |

FOREIGN PATENT DOCUMENTS 59-97238  6/1984  Japan .

*Primary Examiner*—Dwayne D. Bost
*Assistant Examiner*—Jean A. Gelin
*Attorney, Agent, or Firm*—Ostrolenk, Faber, Gerb & Soffen, LLP

[57] ABSTRACT

When a mobile communication terminal unit is using a particular one of a plurality of systems, the mobile communication terminal unit determines whether or not there is a higher priority system than the current system (at step 102). When there is a higher priority system, just before starting monitoring the higher priority system, the mobile communication terminal unit informs the current base station of the monitoring process for the higher priority system and requests the base station to suspend a call to be sent to the mobile communication terminal unit (at step 103). The mobile communication terminal unit monitors the higher priority system and records the monitored result (at step 104). After having monitored the higher priority system (at step 105), the mobile communication terminal unit informs the current base station of the restoration to the current system and requests the base station to cancel the suspension of a call to the mobile communication terminal unit (at step 106).

10 Claims, 6 Drawing Sheets

MOBILE COMMUNICATION NETWORK

BACKGROUND OF THE INVENTION

1. Field of the Invention

The present invention relates to a mobile communication network having mobile communication terminal units and base stations that correspond to a plurality of mobile communication systems including a mobile satellite communication system.

2. Description of the Related Art

In a conventional mobile communication network that integrates a plurality of mobile communication systems including a mobile satellite communication system or the like, each terminal unit has hardware portions corresponding to the individual communication systems. Each mobile communication terminal unit monitors signal levels of signals received from base stations corresponding to individual communication systems, determines whether or not the terminal unit is in a service area of a higher priority system, and switches the current system to the higher priority system. When the mobile communication terminal unit monitors signal levels, it should use different hardware portions corresponding to the individual communication systems.

Referring to FIG. 6, a mobile communication terminal unit 1' operates corresponding to two mobile communication systems that are a cellular system and a mobile satellite communication system. A earth channel base station 6 is a base station of the cellular system. A satellite channel base station 7 is a base station of the mobile satellite communication system. The mobile communication terminal unit 1' comprises antennas $10_1$ and $10_2$, a satellite channel RF portion $20_1$, and a cellular channel RF portion $20_2$. The antennas $10_1$ and $10_2$ operate corresponding to the two different mobile communication systems. Each of the satellite channel RF portion $20_1$ and the cellular channel RF portion $20_2$ performs a power amplifying operation, a frequency converting operation, and a modulating/demodulating operation. The mobile communication terminal unit 1' further comprises a switch 30', a controlling portion 40', and a signal processing portion 70.

Next, a mode switching operation of the mobile satellite communication system mode and the cellular system mode will be described. Now, it is assumed that the priority of the cellular system is higher than that of the mobile satellite communication system. In addition, it is assumed that the mobile communication terminal unit 1' is communicating using the mobile satellite communication system. At this point, as the RF portion of the mobile communication terminal unit 1', the satellite channel RF portion $20_1$ corresponding to the mobile satellite communication system is used. On the other hand, the cellular channel RF portion $20_2$ monitors the signal level of a radio wave received from the earth channel base station 6 so as to determine whether or not the mobile communication terminal unit 1' is in the service area of the cellular system. When the cellular channel RF portion $20_2$ has determined that the mobile communication terminal unit 1 is in the service area of the cellular system, after completing a call in the mobile satellite communication system, the switch 30' of the mobile communication terminal unit 1' switches the satellite channel RF portion $20_1$ to the cellular channel RF portion $20_2$. Thus, the mobile communication terminal unit of the mobile communication network that integrates a plurality of mobile communication systems has hardware portions (RF portions) that are switched corresponding to higher priority systems as disclosed in Japanese Patent Laid-open Publication No. 59-97238.

However, in the mobile communication terminal unit corresponding to a plurality of mobile communication systems, because of hardware portions corresponding to higher priority modes, the size and power consumption of the mobile communication terminal unit increase and the fabrication cost thereof increases. On the other hand, if the hardware portion (such as a power amplifying portion, a frequency converting portion, and a modulating/demodulating portion) is shared by a plurality of communication systems, while the mobile communication terminal unit is in a standby mode of a particular communication system, the hardware portion cannot detect whether or not the mobile communication terminal unit is in the service area of another communication system.

SUMMARY OF THE INVENTION

An object of the present invention is to provide a mobile communication network that allows a mobile communication terminal unit to have a hardware portion shared by a plurality of communication systems and to smoothly switch the current system mode to another system mode.

An aspect of the present invention is a mobile communication network having mobile communication terminal units and base stations that operate corresponding to a plurality of mobile communication systems, each of the mobile communication terminal units comprising a plurality of antenna portions for receiving radio waves from the base stations that operate corresponding to the mobile communication systems, a common RF portion for performing a power amplifying operation, a frequency converting operation, and a modulating/demodulating operation for an RF band signal, the common RF portion being shared by the plurality of mobile communication systems, the common RF portion having a switch for selecting one of the antenna portions, a controlling portion for controlling a switching operation of the switch, for informing a current base station of a monitoring operation for another system (second communication system) of the plurality of mobile communication systems in the standby state of the current mobile communication system (first communication system) and requesting the current base station to suspend a call to be sent to the mobile communication terminal unit, for monitoring whether or not the mobile communication terminal unit is in a service area of the second communication system, and for informing the current base station of the restoration to the first communication system and requesting the current base station to cancel the suspension of a call to the mobile communication terminal unit after having monitored the second communication system, and a signal processing portion for synchronizing received frames.

In a mobile communication network having mobile communication terminal units and base stations that correspond to a plurality of mobile communication systems including a satellite communication system or the like, when a mobile communication terminal unit has selected a particular system from a plurality of communication systems and is in the standby state, to switch the current system to a higher priority system, it is necessary to monitor whether or not the mobile communication terminal unit is in the service area of a base station corresponding to the higher priority system. However, when a power amplifying portion, a frequency converting portion, a modulating/demodulating portion, and so forth of the hardware portion are shared by a plurality of communication systems, while the mobile communication terminal unit is monitoring the service area of the other communication system, even if a call corresponding to the current system is terminated to the mobile communication terminal unit, it cannot detect the call.

To solve this problem, according to the present invention, when the mobile communication terminal unit monitors another system, the terminal unit informs the current base station of the monitoring operation of the other system and request the current base station to suspend a call to be sent to the terminal unit for a predetermined time period. After having monitored the other system and restored the current system, the mobile communication terminal unit restores the communication with the current base station. Thus, the mobile communication terminal unit can prevent a call corresponding to the current system from being lost.

According to another aspect of the present invention, each of the base stations has a means for canceling the suspension of a call to the mobile communication terminal unit in a predetermined time period while the mobile communication terminal unit is in the standby state of the first communication system after the controlling portion has informed the current base station of the monitoring operation for the second communication system without need to inform the current base station of the restoration to the first communication system.

According to another aspect of the present invention, the controlling portion has a means for informing the current base station of monitor time that is necessary for the monitoring operation for each of the communication systems and that is stored in the controlling portion, while the mobile communication terminal unit is in the standby state of the first communication system, when the controlling portion informs the current base station of the monitoring operation for the second communication system, and wherein the current base station has a means for suspending a call to be sent to the mobile communication terminal unit for the monitor time.

According to another aspect of the present invention, the controlling portion has a means for informing the current base station of the restoration to the first communication system and requesting the current base station to cancel the suspension of a call to be sent to the mobile communication terminal unit when the controlling portion has completed the monitoring operation of the second communication system within the monitor time and restored the first communication system.

According to another aspect of the present invention, the mobile communication terminal unit has a timer and a storing device, and wherein the controlling portion has a means for calculating the monitor time for each of the communication systems with the timer and storing average time of the monitor time of each of the communication systems as a timer value to the storing device, and a means for informing the current base station of a total time corresponding to the timer value stored in the storing device while the mobile communication terminal unit is in the standby mode of the first communication system when the controlling portion monitors whether or not the mobile communication terminal unit is in the service area of the second communication system.

According to another aspect of the present invention, the mobile communication systems include a mobile satellite communication system.

These and other objects, features and advantages of the present invention will become more apparent in light of the following detailed description of a best mode embodiment thereof, as illustrated in the accompanying drawings.

DESCRIPTION OF PREFERRED EMBODIMENTS

With reference to the accompanying drawings, embodiments of the present invention will be described.

Figure 1:
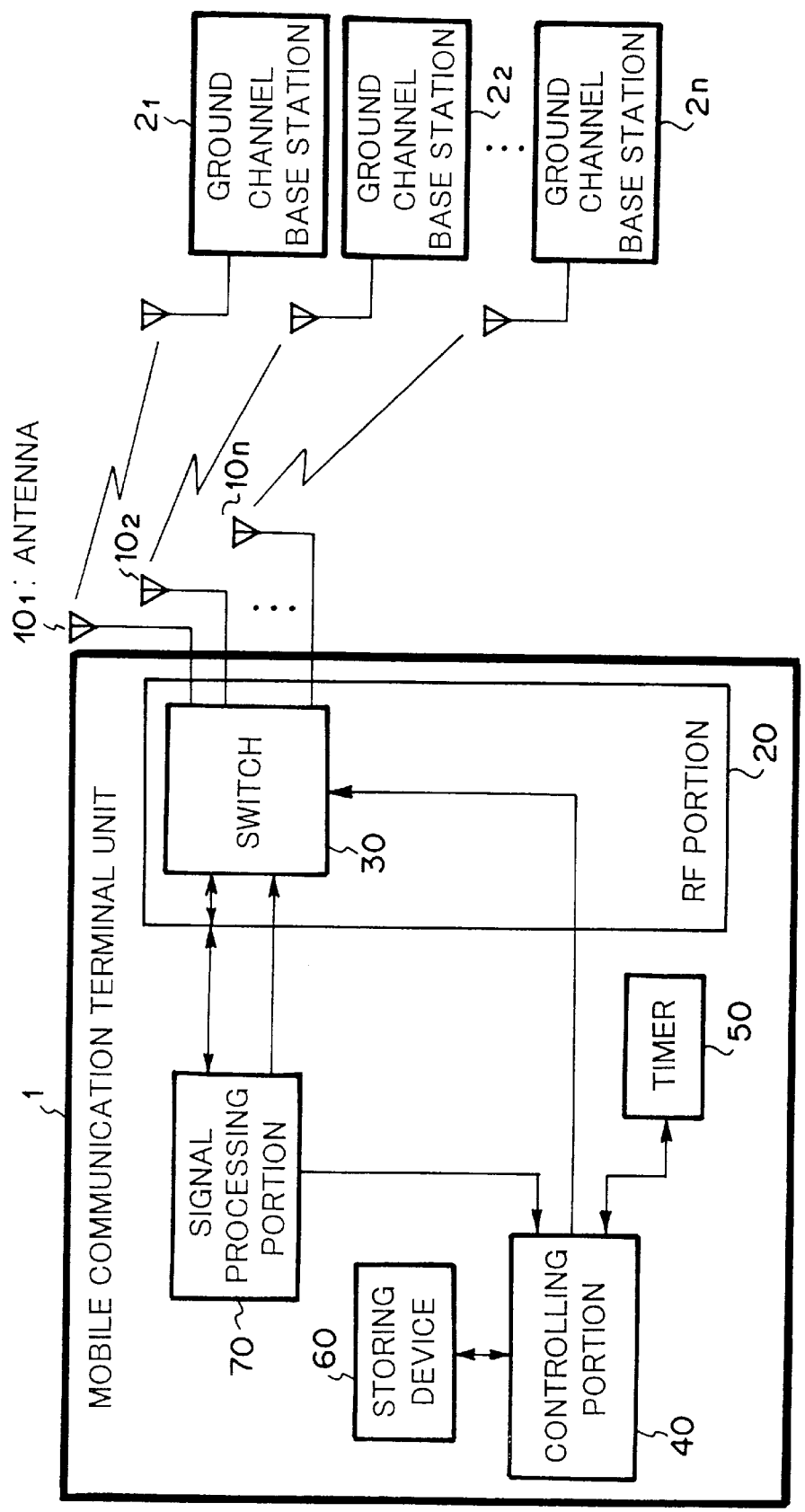
FIG. 1 is a block diagram showing the structure of a mobile communication network according to a first embodiment of the present invention.
Figure 2:
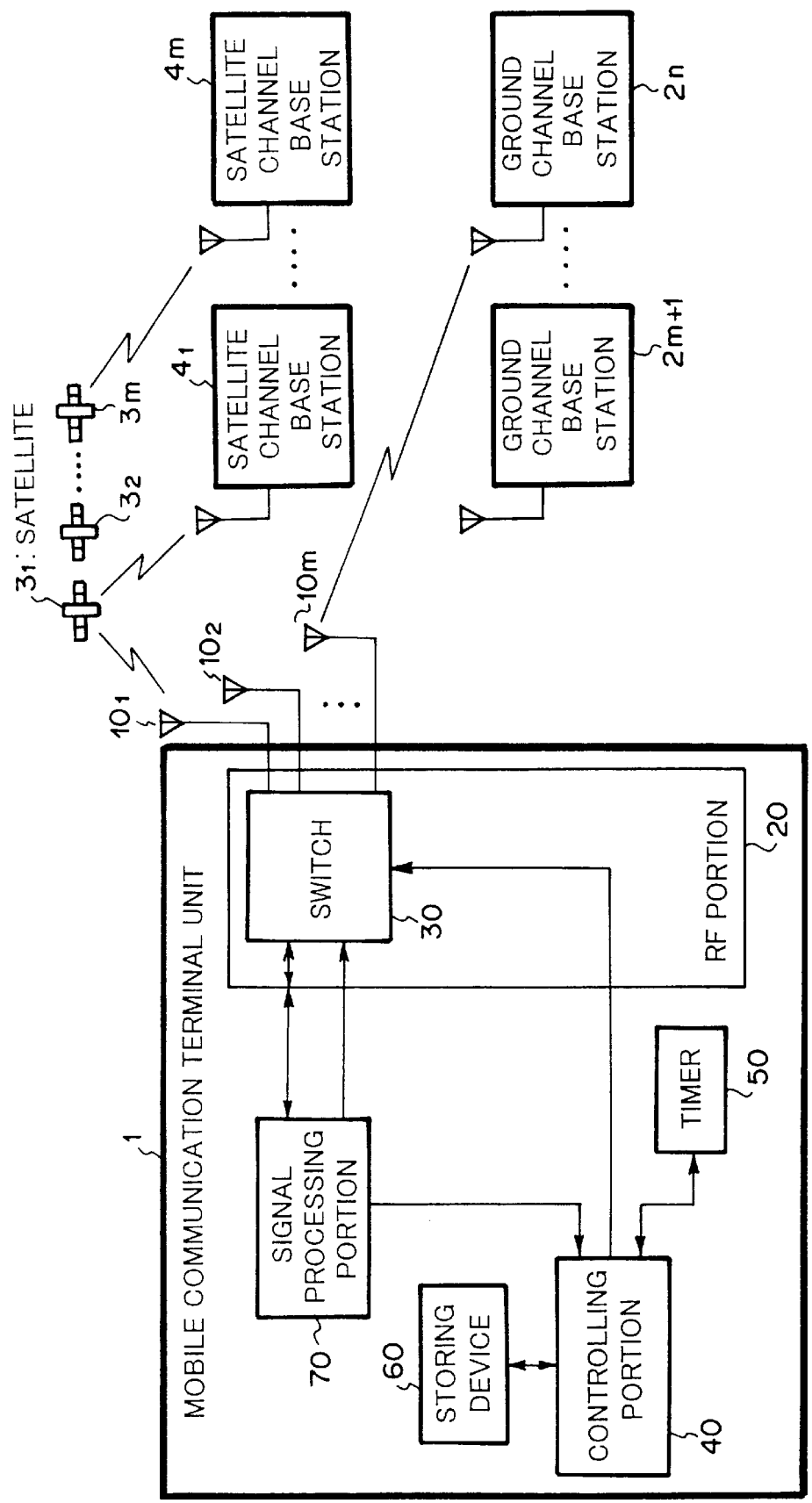
FIG. 2 is a block diagram showing the structure of a mobile communication network according to a second embodiment of the present invention.

FIG. 1 is a block diagram showing the structure of a mobile communication network according to a first embodiment of the present invention. FIG. 2 is a block diagram showing the structure of a mobile communication network according to a second embodiment of the present invention.

The mobile communication network according to the first embodiment integrates n types of mobile communication systems including earth channel base stations $2_1, 2_2, \ldots, 2_n$. The mobile communication network according to the second embodiment integrates m types of mobile satellite communication systems and (n−m) types of mobile communication systems. The m types of mobile satellite communication systems include satellites $3_1$ to $3_m$ and satellite channel base stations $4_1$ to $4_m$. The (n−m) types of mobile communication systems include earth channel base stations $2_{m+1}, 2_{m+2}, \ldots, 2_n$.

The mobile communication terminal unit 1 comprises n antennas $10_1$ to $10_n$, a switch 30, an RF portion 20, a timer 50, and a storing device 60, and a controlling portion 40. The switch 30 selects one of the antennas $10_1$ to $10_n$. The RF portion 20 performs a power amplifying operation, a frequency converting operation, and an RF band signal modulating/demodulating operation shared by the individual mobile communication systems. The controlling portion 40 controls the switching operation of the switch 30. While the mobile communication terminal unit 1 is in the standby mode of the current system (referred to as system S1), the controlling portion 40 informs the current base station (referred to as base station B1) of the monitoring operation of another system (referred to as system S2) so as to monitor whether the mobile communication terminal unit 1 is in the service area of the system S2. In addition, the controlling portion 40 requests the base station B1 to suspend a call to be sent from the base station B1 to the mobile communication terminal unit 1. After having monitored the system S2 and restored the system S1, the controlling portion 40 informs the base station B1 of the restoration to the system S1 and requests the base station B1 to cancel the suspension of a call to the terminal unit 1. In addition, the controlling portion 40 calculates the monitor time for each system with the timer 50, stores the average monitor time for each system, and records the average monitor time as a timer value to the storing device 60. The mobile communication terminal unit 1 further comprises a signal processing portion 70 that synchronizes received frames. The priority of the communication systems is designated in the order of for example IS136 (TDMA), PCS1900 (GSM), IS-95 (cdmaone), IRIDIUM system, INMARSAT P system, and static satellite system.

The RF portion 20 uses for example a 12-GHz band for a satellite communication system. The earth channel systems are categorized as a simple portable telephone system and a regular portable telephone system. The RF portion 20 uses a 1.9-GHz band and a 900-MHz band for the simple portable telephone system and the regular portable telephone system, respectively. When a signal is received from the 12-GHz band satellite communication system, the signal is down-converted into a 1-GHz band signal as a first intermediate frequency signal. When a signal is received from the 1.9-GHz simple portable telephone system, the signal is down-converted into a 1-GHZ band signal as a first intermediate frequency signal. When a signal is received from the 900-MHz regular portable telephone system, the signal is up-converted into a 1-GHz band signal as a first intermediate frequency signal. In the stage of the first intermediate frequency signal, one of signals corresponding to these systems is selected by the switch 30. When a signal is transmitted, a 1-GHz band signal is used. One of the signals corresponding to these systems is selected by the switch 30. The selected signal is up-converted or down-converted into a desired frequency signal and then supplied to the relevant antenna. In each of the structures shown in FIGS. 1 and 2, the RF portion 20 transmits or receives a signal corresponding to the selected system so as to improve the sharing efficiency thereof.

Figure 3:
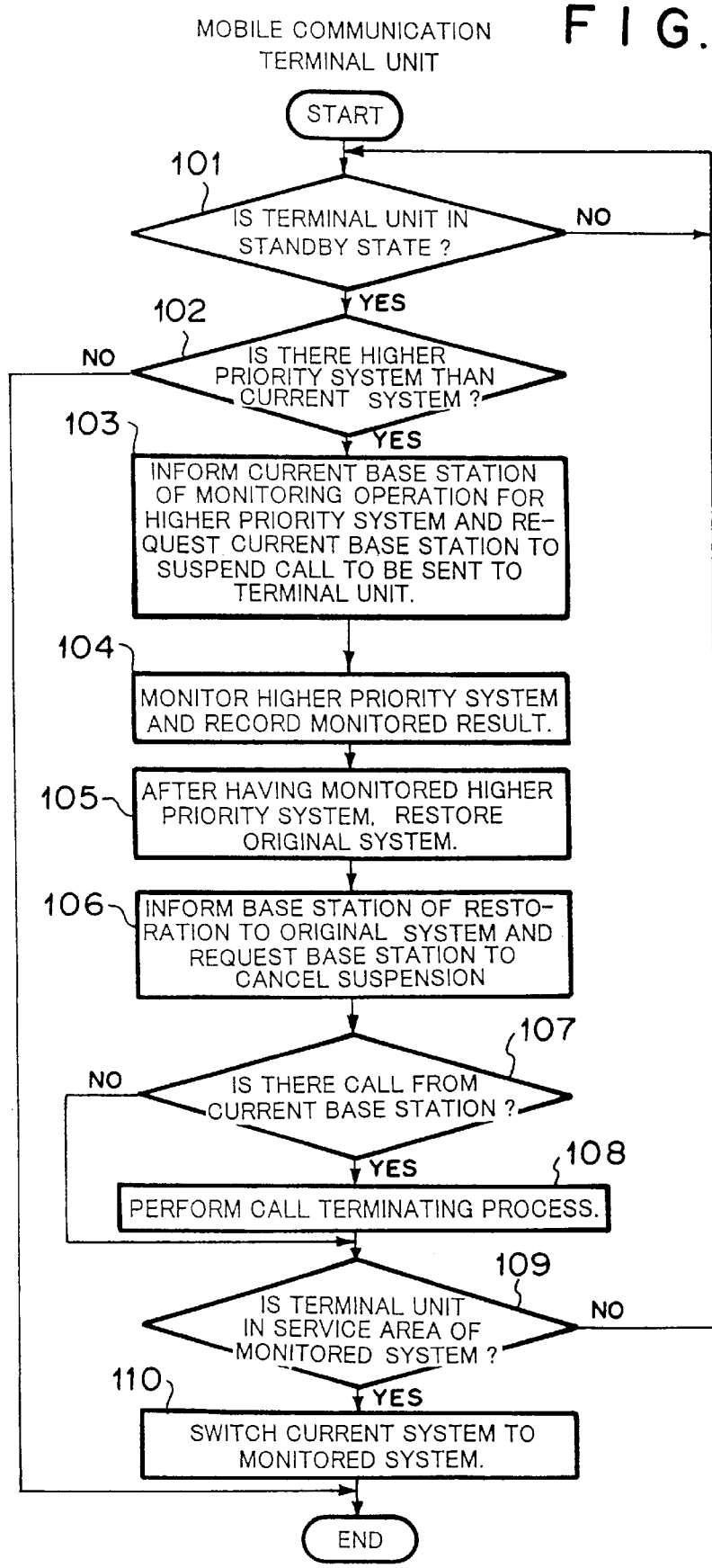
FIG. 3 is a flow chart showing a first mode switching operation of each of the mobile communication networks shown in FIG. 1 or 2.
Figure 4:
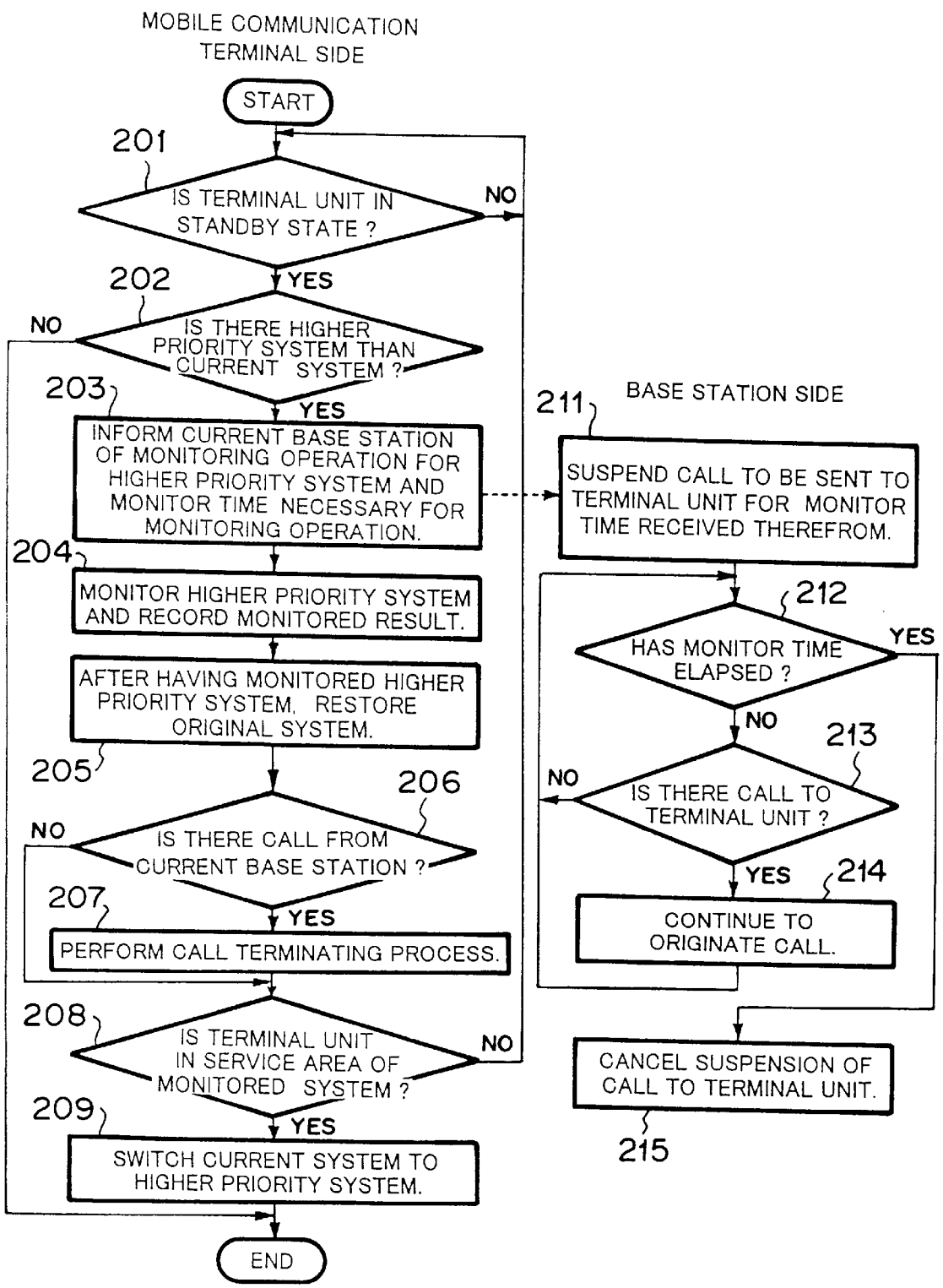
FIG. 4 is a flow chart showing a second mode switching operation of each of the mobile communication networks shown in FIG. 1 or 2.
Figure 5:
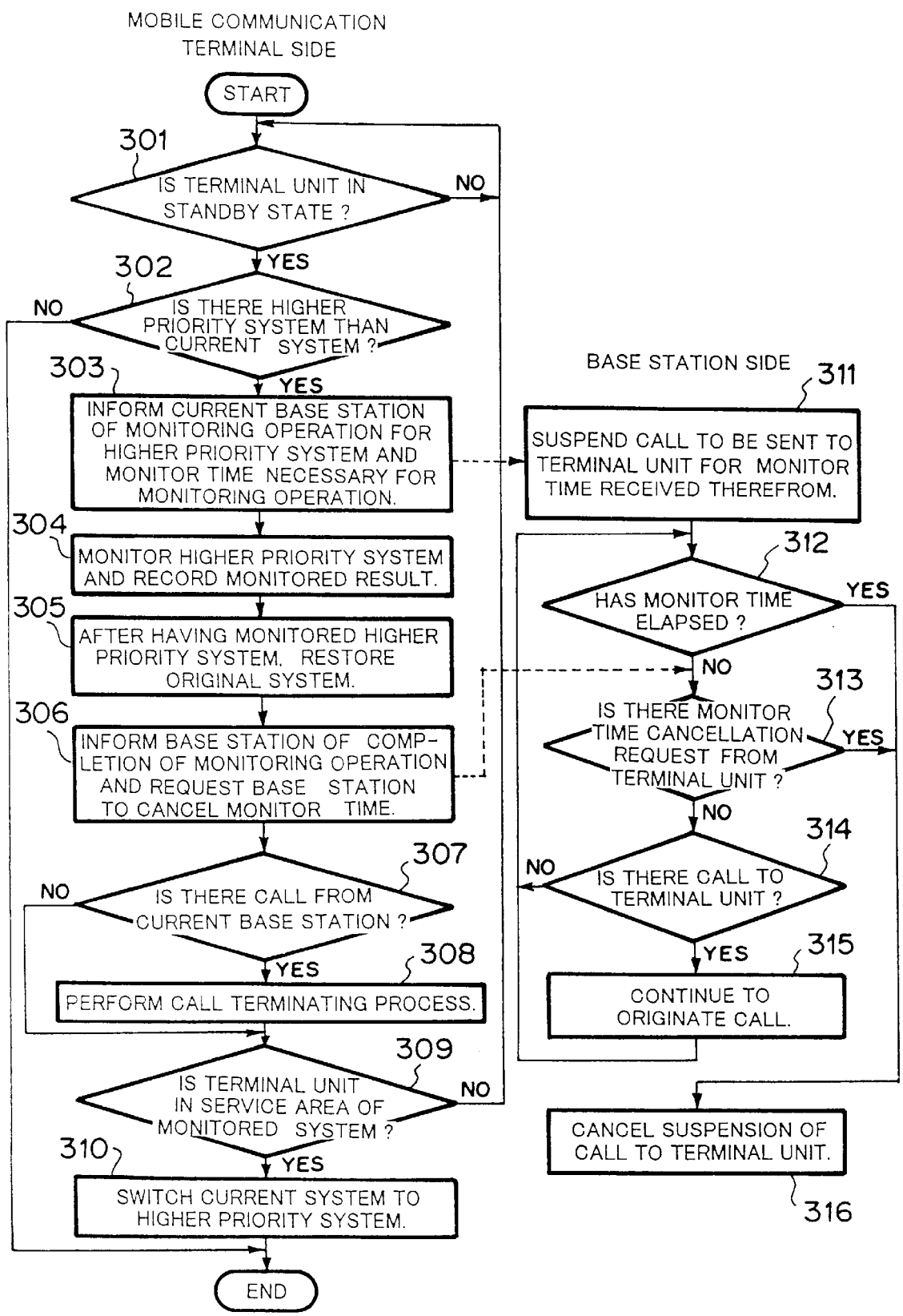
FIG. 5 is a flow chart showing a third mode switching operation of each of the mobile communication networks shown in FIG. 1 or 2.
Figure 6:
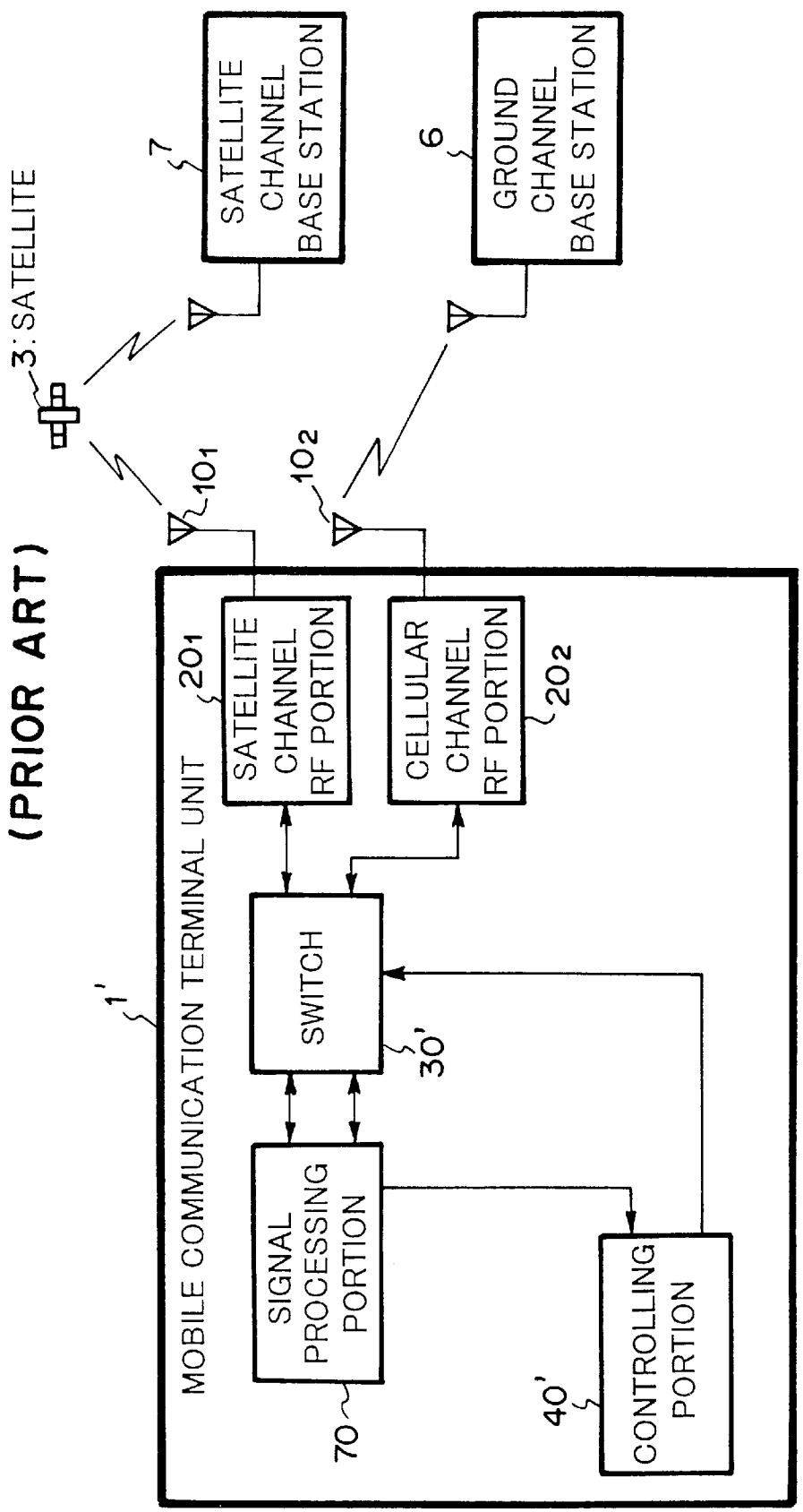
FIG. 6 is a block diagram showing the structure of the conventional mobile communication network.

FIGS. 3, 4, and 5 are flow charts showing mode switching operations in the structures of the mobile communication networks shown in FIGS. 1 and 2.

(1) First Mode Switching Operation (FIG. 3)

While the mobile communication terminal unit 1 is using one of the mobile communication systems, the controlling portion 40 determines whether or not the mobile communication terminal unit 1 is in the standby state for a call (at step 101). When the determined result at step 101 is No, the controlling portion 40 waits until the mobile communication terminal unit 1 becomes the standby state. When the determined result at step 101 is Yes, the controlling portion 40 determines whether or not there is a higher priority system than the current system (at step 102). When the determined result at step 102 is No, the controlling portion 40 just completes the mode switching operation. When the determined result at step 102 is Yes, just before starting monitoring the higher priority system, the controlling portion 40 informs the current base station of the monitoring operation for the higher priority system and requests the current base station to suspend a call to be sent to the mobile communication terminal unit 1 (at step 103). The mobile communication terminal unit 1 monitors the higher priority system and records the monitored result (at step 104). After having monitored the higher priority system (at step 105), the mobile communication terminal unit 1 informs the current base station for the restoration to the current system and requests the base station 1 to cancel the suspension of a call to the mobile communication terminal unit 1 (at step 106). When the current base station originates a call to the mobile communication terminal unit 1, it performs a process corresponding to the call (call terminating process) (at steps 107 and 108). When the current base station does not originate a call to the mobile communication terminal unit 1, it does not perform the call terminating process. The controlling portion 40 determines whether or not the mobile communication terminal unit 1 is in the service area of the higher priority system corresponding to the monitored result at step 104 (at step 109). When the determined result at step 109 is No, the flow returns to step 101. The controlling portion 104 repeats the process from steps 101 to 109 until the mobile communication 17 terminal unit 1 enters the service area of the higher priority system. When the determined result at step 109 is Yes, the controlling portion 40 switches the current system to the higher priority system (at step 110).

(2) Second Mode Switching Operation (FIG. 4)

While the mobile communication terminal unit 1 is using one of a plurality of mobile communication systems, the controlling portion 40 determines whether or not the mobile communication terminal unit 1 is in the standby state for a call (at step 201). When the determined result at step 201 is No, the controlling portion 40 waits until the mobile communication terminal unit becomes the standby state. When the determined result at step 201 is Yes, the controlling portion 40 determines whether or not there is a higher priority system than the current system (at step 202). When the determined result at step 202 is No, the controlling portion 40 just completes the mode switching operation. When the determined result at step 202 is Yes, just before starting monitoring the higher priority system, the controlling portion 40 informs the current base station of the monitoring operation of the higher priority system and monitor time necessary for the monitoring operation (at step 203). In addition, the controlling portion 40 requests the current base station to suspend a call to be sent to the mobile communication terminal unit 1 during the monitor time. The controlling portion 40 monitors the higher priority system and records the monitored result to the storing device 60 (at step 204). After having monitored the higher priority system (at step 205), when the current base station originates a call to the mobile communication terminal unit 1, the controlling portion 40 performs a process corresponding to the call (call terminating process) (at steps 206 and 207). When the current base station does not originate a call to the mobile communication terminal unit 1, the controlling portion 40 does not perform the call terminating process. Next, corresponding to the monitored result at step 204, the controlling portion 40 determines whether or not the mobile communication terminal unit 1 is in the service area of the higher priority system (at step 208). When the determined result at step 208 is No, the flow returns to step 201. The controlling portion 40 repeats the operation after step 201 until the mobile communication terminal unit enters the service area of the higher priority system. When the determined result at step 208 is Yes, the controlling portion 40 switches the current system to the higher priority system (at step 209). On the other hand, the current base sation suspends a call to be sent to the mobile communication terminal unit 1 for the monitor time received therefrom at step 203 (at step 211). Until the monitor time elapses, the base station determines whether or not there is a call to be sent to the mobile communication terminal unit 1 (at steps 212 and 213). When the determined result at step 213 is No, the flow returns to step 212. When the determined result at step 213 is Yes, the base station does not determine that the mobile communication terminal unit 1 is not in the service area thereof and continues to originate a call (at step 214). Thereafter, the flow returns to step 212. After the monitor time elapses, the base station cancels the suspension of a call to the mobile communication terminal unit 1 (at step 215).

(3) Third Mode Switching Operation (FIG. 5)

While the mobile communication terminal unit 1 is using one of a plurality of mobile communication systems, the controlling portion 40 determines whether or not the mobile communication terminal unit is in the standby state for a call (at step 301). When the determined result at step 301 is No, the controlling portion 40 waits until the mobile communication terminal unit becomes the standby state. When the determined result at step 301 is Yes, the controlling portion 40 determines whether or not there is a higher priority system than the current system (at step 302). When the determined result at step 302 is No, the controlling portion 40 just completes the mode switching operation. When the determined result at step 302 is Yes, just before starting monitoring the higher priority system, the controlling portion 40 informs the current base station of the monitoring operation for the higher priority system and monitor time necessary for the monitoring operation (at step 303). In addition, the controlling portion 40 requests the current base station to suspend a call to be sent to the mobile communication terminal unit 1 during the monitor time. Next, the mobile communication terminal unit 1 monitors the higher priority system and records the monitored result to the storing device 60 (at step 304). After having monitored the higher priority system, the controlling portion 40 informs the current base station of the completion of the monitoring operation and requests the current base station to cancel the monitor time (at step 306). When the current base station originates a call to the mobile communication terminal unit 1, the controlling portion 40 performs a process corresponding to the call (call terminating process) (at steps 307 and 308). When the current base station does not originate a call to the mobile communication terminal unit 1, the controlling portion 40 does not perform the call terminating process. Next, corresponding to the monitored result at step 304, the controlling portion 40 determines whether or not the mobile communication terminal unit 1 is in the service area of the higher priority system (at step 309). When the determined result at step 309 is No, the flow returns to step 301. The controlling portion 40 repeats the operation after step 301 until the mobile communication terminal unit 1 enters the service area of the higher priority system. When the determined result at step 309 is Yes, the controlling portion 40 switches the current system to the higher priority system (at step 310). The base station suspends a call to be sent to the mobile communication terminal unit 1 for the monitor time received therefrom at step 303 (at step 311). After the monitor time has elapsed, the base station cancels the suspension of a call to the mobile communication terminal unit 1 (at steps 312 and 316). Until the monitor time elapses, the base station 4 determines whether or not the base station has received a monitor time cancellation request from the mobile communication terminal unit 1 (at step 313). When the determined result at step 313 is Yes, the base station cancels the suspension of a call to the mobile communication terminal unit 1 (at step 316). When the determined result at step 313 is No, the base station determines whether or not there is a call to be sent to the mobile communication terminal unit 1 (at step 314). When the determined result at step 314 is No, the flow returns to step 312. When the determined result at step 314 is Yes, the base station does not determine that the mobile communication terminal unit 1 is out of the service area thereof and continues to originate a call (at step 315). Thereafter, the flow returns to step 312.

As described above, in the mobile communication terminal unit for use with the mobile communication network integrating a plurality of mobile communication systems including a satellite communication system and so forth according to the present invention, the power amplifying portion, frequency converting portion, and RF signal modulating/demodulating portion are shared by the communication systems so as to reduce the size, weight, power consumption, and cost of the mobile communication terminal unit. In addition, in the mobile communication terminal unit, the current communication system can be smoothly switched to a higher priority system.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A mobile communication network having mobile communication terminal units and base stations that operate corresponding to a plurality of mobile communication systems, each of the mobile communication terminal units comprising:

a plurality of antenna portions for receiving radio waves from the base stations that operate corresponding to the mobile communication systems;

a common RF portion for performing a power amplifying operation, a frequency converting operation, and a modulating/demodulating operation for an RF band signal, said common RF portion being shared by the plurality of mobile communication systems, said common RF portion having a switch for selecting one of said antenna portions;

a controlling portion for controlling a switching operation of the switch, for informing a current base station of a monitoring operation for another system (second communication system) of the plurality of mobile communication systems in the standby state of the current mobile communication system (first communication system) and requesting the current base station to suspend a call to be sent to the mobile communication terminal unit, for monitoring, whether or not the mobile communication terminal unit is in a service area of the second communication system, and for informing the current base station of the restoration to the first communication system and requesting the current base station to cancel the suspension of a call to the mobile communication terminal unit after having monitored the second communication system; and a signal processing portion for synchronizing received frames.

2. The mobile communication network as set forth in claims 1, wherein the mobile communication systems include a mobile satellite communication system.

3. The mobile communication network as set forth in claim 1, wherein each of the base stations has:

means for canceling the suspension of a call to the mobile communication terminal unit in a predetermined time period while the mobile communication terminal unit is in the standby state of the first communication system after said controlling portion has informed the current base station of the monitoring operation for the second communication system without need to inform the current base station of the restoration to the first communication system.

4. The mobile communication network as set forth in claim 3, wherein the mobile communication systems include a mobile satellite communication system.

5. The mobile communication network as set forth in claim 1, wherein said controlling portion has:
   means for informing the current base station of monitor time that is necessary for the monitoring operation for each of the communication systems and that is stored in said controlling portion, while the mobile communication terminal unit is in the standby state of the first communication system, when said controlling portion informs the current base station of the monitoring operation for the second communication system, and
wherein the current base station has:
   means for suspending a call to be sent to the mobile communication terminal unit for the monitor time.

6. The mobile communication network as set forth in claims 5,
   wherein the mobile communication systems include a mobile satellite communication system.

7. The mobile communication network as set forth in claim 1,
   wherein said controlling portion has:
      means for informing the current base station of the restoration to the first communication system and requesting the current base station to cancel the suspension of a call to be sent to the mobile communication terminal unit when said controlling portion has completed the monitoring operation of the second communication system within the monitor time and restored the first communication system.

8. The mobile communication network as set forth in claims 7,
   wherein the mobile communication systems include a mobile satellite communication system.

9. The mobile communication network as set forth in claim 1,
   wherein the mobile communication terminal unit has:
      a timer and a storing device, and
   wherein said controlling portion has:
      means for calculating the monitor time for each of the communication systems with the timer and storing average time of the monitor time of each of the communication systems as a timer value to the storing device; and
      means for informing the current base station of a total time corresponding to the timer value stored in the storing device while the mobile communication terminal unit is in the standby mode of the first communication system when said controlling portion monitors whether or not the mobile communication terminal unit is in the service area of the second communication system.

10. The mobile communication network as set forth in claims 9,
   wherein the mobile communication systems include a mobile satellite communication system.

* * * * *